Patented Oct. 1, 1946

2,408,468

UNITED STATES PATENT OFFICE 2,408,468

GLASS COMPOSITION

Kenneth C. Lyon, Millville, N. J., assignor to General Electric Company, a corporation of New York No Drawing. Application December 3, 1942, Serial No. 467,813

2 Claims. (Cl. 106—54)

This invention relates to glass material which is electrically fusible by resistance melting, being sufficiently conductive for this purpose when adequately heated. The invention is especially useful in connection with glasses intended for the fabrication of hermetic seals for vitreous vessels, such as the envelopes of electric lamps and discharge devices, either for the passage of metal current leads through their walls, or for uniting parts of different vitreous materials. An example of the first-mentioned use of such an intermediate seal glass is for sealing a lead-wire of tungsten metal (whether tungsten itself, or molybdenum) through the wall of an envelope of fused quartz or "quartz glass," as it is termed; an example of the second is for joining quartz glass and chemical-resistant borosilicate glass such as that marketed under the trade name "Pyrex," for instance. This is particularly useful in making a lead joint with the aid of a "Fernico" metal alloy cup brazed around the lead wire and having its thinned edge beaded with fused "Pyrex" glass (such as marketed by Corning Glass Works under various designations, including "702 EJ," and "774") which is sealed to the quartz envelope by a short intermediate length of my seal glass. If desired, several such lengths of intermediate seal glass of different compositions may intervene between the quartz glass and the Pyrex, or between quartz and tungsten. The invention is explained hereinafter with particular reference to alumino-borosilicate seal glass suitable for such purposes.

One reason for the use of an intermediate glass or glasses in sealing metal leads through quartz glass, or in joints between the latter and "Pyrex," or the like, lies in the great difference in expansion and contraction between metals such as tungsten, with a thermal expansion coefficient of about $45 \times 10^{-7}$, and quartz, whose coefficient is about $6 \times 10^{-7}$, or Pyrex such as referred to above, whose coefficient is about $33 \times 10^{-7}$. To produce sound and permanently tight joints with quartz, the intermediate glass must have a coefficient not too much above $6 \times 10^{-7}$: for example, alumino-borosilicate glass with a moderate coefficient of about $15 \times 10^{-7}$ has proved very satisfactory between quartz and tungsten. For facility in the glass-working technique involved, it is desirable that the intermediate or seal glass should have only a moderately high melting or softening temperature, a requirement that is also satisfactorily met by alumino-borosilicate seal glass. As alkali components of glass have the effect of materially raising its thermal coefficient of expansion, even when their percentage in the glass is small, and may have other objectionable effects, it is generally desirable to avoid their quantitative presence in glass intended for intermediate seal purposes, or which is to have a moderate coefficient of expansion for any other reason.

On the other hand, it is advantageous in some cases to be able to fuse glass material electrically, by resistance melting of the glass-batch or of the actual glass itself; and this requires that the material should be conductive when heated sufficiently. Such electric resistance melting offers a means of attaining a high temperature directly in the glass material itself, without necessity for intimate contact of the melt with a container of different composition from the glass material and at a higher temperature. Alkalies are the natural and suitable ingredients for conferring conductivity on glass material, either in the glass batch or in the ultimate glass; yet it is precisely alkalies whose presence in substantial proportion is objectionable with respect to the coefficient of expansion of the glass.

I have found that this problem can be solved by avoiding both the substantial though minor percentages of alkali that have heretofore been generally used in glass, and the commonly used soda ($Na_2O$) and potash ($K_2O$) alkalies. Instead of such common alkalies and substantial percentages, I use the rarer alkali lithia ($Li_2O$) in the nominal proportion of a fractional percentage, which may be as small as ¼ of one per cent. I have found that even a very nominal proportion or small fractional percentage like ¼ of 1 per cent of lithia renders glass suitably conductive for resistance melting by electricity, yet does not raise its thermal expansion coefficient substantially. Such a nominal proportion of soda or potash alkali as this would be practically ineffective for rendering glass material conductive and fusible by resistance melting; indeed, to produce an effect equivalent to that of ¼ of 1 per cent lithia ($Li_2O$), it would be necessary to use 1 per cent of soda ($Na_2O$), or 2½ per cent of potash ($K_2O$). It has also been found that the seal glass containing a minor fractional percentage of lithia "wets" and seals very well to the metallic and vitreous materials with which it must be used, such as tungsten, quartz glass, and Pyrex. While lithia has heretofore been proposed as an ingredient of glass, and even of alumino-borosilicate glass, this has been in combination with soda or potash alkali in proportions so large as to involve a substantial increase in the coefficient of expansion.

Other features and advantages of the invention will become apparent from the description of species and forms of embodiment.

An electrically fusible glass can be produced by merely adding about ¼ per cent lithia to an ordinary borosilicate glass formula, or by substituting this amount of lithia for a like amount of silica in the formula. Such a glass may have the following percentage composition by weight:

| | |
|---|---|
| Silica ($SiO_2$) | 83.25 |
| Alumina ($Al_2O_3$) | 4.5 |
| Boric oxide ($B_2O_3$) | 12 |
| Lithia ($Li_2O$) | ¼ |

The glass may be melted in a small electric glass-furnace having an elongated hearth with electrodes at its opposite ends, which may be of tungsten, or of molybdenum.

A raw batch for producing such a glass may be prepared and mixed just as for known borosilicate glasses, the necessary excess of any ingredient(s) subject to volatilization during melting (such as boric oxide) being of course provided in the batch. Operations may be started by simply placing this raw batch in the furnace and heating it by heat externally applied to the furnace hearth until the batch conducts current sufficiently to allow the heating to be continued merely by passage of current therethrough.

Alternatively, an amount of previously prepared cullet glass of similar composition may first be placed in the furnace and melted, heat being applied to the hearth externally (as by gas flames) until this glass reaches a sufficient temperature and provides a continuous conductive path between the electrodes. The amount of glass thus used may be no more than enough to form a melt with which both electrodes are in contact. Heating being continued by passing electric current (preferably A. C.) through the preliminary melt, the raw batch mix may be added somewhat gradually, in small quantities, so as not to chill the melt below a temperature at which it is conductive, until the whole batch mix is completely melted.

The melt may be largely freed of gas bubbles naturally present in it by introducing light gas (of small molecular diameter and low specific gravity) that is reducing in character, or at least substantially inert toward the desired solid glass components in their hot fused state (such as hydrogen or helium) through the hearth of the furnace, and allowing it to seep up through the glass material before and during the melting, at all stages of the operation. This results in diffusion of air, water vapor, or any gases present in the melt (e. g., as result of the melting process or of incidental reactions in the batch) into the bubbles of light gas, so as to be entrained and swept out of the melt in these bubbles. This also largely obviates or minimizes the "boiling" of such glass that otherwise generally occurs when the ultimate glass is being worked into desired form and fabricated into a seal. Besides this, the gas prevents any possibility of electrode oxidation during the operation of the furnace.

Lithium compounds other than lithia ($Li_2O$) itself may be used in preparing electrically fused glass of this character: for example, the following raw batch formula has been used, the proportions being by weight:

| | |
|---|---|
| Silica, powdered | 78.23 |
| Alumina | 4.25 |
| Boric oxide | 16.96 |
| Lithium carbonate ($Li_2CO_3$) | .57 |

This batch may be melted electrically in the manner already described. Gas bubbles, which arise from entrapped air and from products of reaction during fusion, may be removed by subjecting the melt to a reduced pressure in a vacuum chamber enclosing the furnace hearth, so that the resulting glass is essentially free of such bubbles.

Assuming the only change to be conversion of the lithium carbonate to lithia during melting, the composition of the product would differ from that of the raw batch formula given above mainly in that the lithium component would be less than half what it is in the batch. However, experience with batches of similar composition under similar heat treatment indicates that during the melting more than ⅓ of the original boric oxide is lost by volatilization, or about 36 per cent, so that the ultimate percentage composition by weight should be approximately:

| | |
|---|---|
| Silica | 85 |
| Alumina | 5 |
| Boric oxide | 11 |
| Lithia | ¼ |

Actually, this may be modified by volatilization loss of lithia and by absorption of alumina and silica by solution from the container walls into the melt.

In practice, the batch formulae hereinbefore given may be widely modified consistently with the invention, according to the properties desired for various different uses.

What I claim as new and desire to secure by Letters Patent of the United States is:

1. A borosilicate seal glass adapted for fusion by passage of electric current through it while heated, and characterized by a lithia content of only a minor fraction of a per cent and by essential freedom from alkali other than lithia, whereby it is rendered conductive when heated without substantial increase of its thermal expansion.

2. A borosilicate seal glass adapted for fusion by passage of electric current through it while heated, and characterized by containing silica in major proportion, boric oxide and alumina in minor proportions, and only a minor fraction of a per cent of lithia, and by essential freedom from alkali other than lithia, whereby it is rendered conductive when heated without substantial increase of its thermal expansion.

KENNETH C. LYON.